No. 897,092. PATENTED AUG. 25, 1908.
E. H. GREGORY.
AUTOMATIC BELT GUIDE.
APPLICATION FILED JAN. 17, 1908.
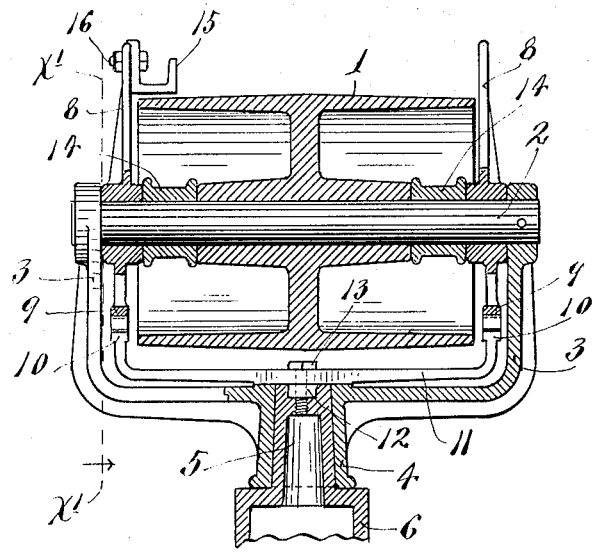
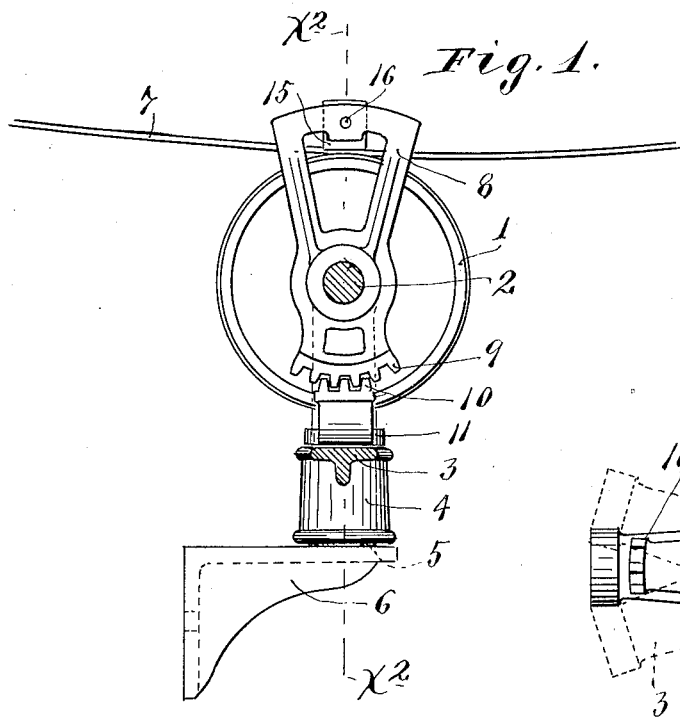
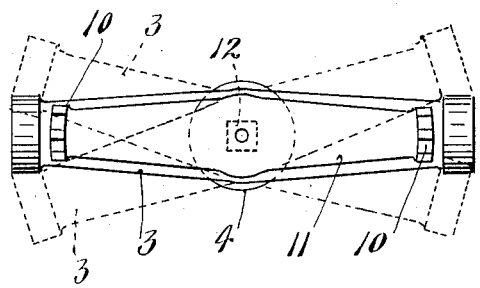
Witnesses
A. H. Opsahl.
H. D. Kiegon
Inventor
E. H. Gregory.
By his Attorneys
Williamson Merchant

UNITED STATES PATENT OFFICE.

ERASTUS H. GREGORY, OF SIOUX FALLS, SOUTH DAKOTA.

AUTOMATIC BELT-GUIDE.

No. 897,092.　　　Specification of Letters Patent.　　　Patented Aug. 25, 1908.

Application filed January 17, 1908. Serial No. 411,342.

*To all whom it may concern:*

Be it known that I, ERASTUS H. GREGORY, a citizen of the United States, residing at Sioux Falls, in the county of Minnehaha and State of South Dakota, have invented certain new and useful Improvements in Automatic Belt-Guides; and I do hereby declare the following to be a full, clear, and exact description of the invention, such as will enable others skilled in the art to which it appertains to make and use the same.

My invention has for its object to provide an improved automatically adjustable belt guide adapted for general use, but especially adapted for use on belts used to transmit power from a threshing engine to a threshing machine.

To the above ends the invention consists of the novel devices and combinations of devices hereinafter described and defined in the claims.

In the accompanying drawings which illustrate the invention, like characters indicate like parts throughout the several views.

Referring to the drawings, Figure 1 is a view chiefly in side elevation, with some parts sectioned on the line $x^1\ x^1$ of Fig. 2, showing the improved belt guide. Fig. 2 is a transverse vertical section taken on the line $x^2\ x^2$ of Fig. 1, some parts being broken away; and Fig. 3 is a plan view of the belt guide, with the guide pulley removed therefrom.

The belt guiding pulley 1 is loosely mounted on a horizontal spindle 2 that is rigidly secured at its ends to the up-turned prongs of the oscillatory bearing yoke 3. This bearing yoke 3, at its central portion, is provided with a sleeve 4 that is swiveled on the vertical trunnion 5 of a bearing bracket 6, which bearing bracket is adapted to be rigidly secured to any suitable support and would usually be secured to one side of the front end of the threshing machine case or frame, so as to support the pulley 1 in proper position to guide the power transmission belt 7 onto the usual pulley provided on the projecting end of the threshing cylinder (not shown).

Intermediately pivoted on the fixed spindle 2, adjacent to each end of the pulley, is a lever 8, the lower end of which carries a segmental gear 9, and the upper end of which projects above the pulley, in position to be engaged by the adjacent edge of the belt 7. The two segmental gears 9 mesh with short racks 10 carried by the ends of a bar 11, which bar is rigidly secured at its intermediate portion to the upper end of the trunnion 5, the said bar, as shown, having a square boss 12 that fits a square seat in the said trunnion and is rigidly clamped to the said trunnion by a screw 13, shown as passed through said bar and screwed into the said trunnion. As shown in the drawings, spacing sleeves 14 are placed on the spindle 2 between the hub of the pulley 1 and the hubs of the levers 8.

The operation of the belt guiding device above described is as follows: Whenever the pulley 1 is out of proper alinement with the belt, one edge of the belt will run off from one end of the pulley and will strike against the upwardly projecting end of one or the other of the levers 8, and the upper end of the engaged lever will be caused to move in the direction of the travel of the engaging portion of the belt. When one of the levers 8 is thus engaged it will move on the corresponding fixed rack 10 (the latter acting as a fulcrum) and the corresponding side of the bearing yoke 3 and hence, the said pulley will be moved forward in the direction of the travel of the belt until, by the changed angle of the pulley in respect to the belt, the latter will be caused to shift and run centrally on the said pulley. In this way the two belt engaging levers, under the action of the belt, automatically move the pulley and keep the same in such alinement or at such angle to the belt that the belt will be caused to properly run upon the pulley and at no time will allow the belt to run off from the pulley more than enough to bring the edge of the belt into comparatively light engagement with one or the other of said levers.

To adapt the belt guide for use in connection with a belt that is narrower than the width of the pulley, I provide belt guiding clips or lugs 15 which, as shown, are detachably secured to the upper ends of the levers 8, by means of screws 16.

The device above described is of simple construction and of small cost, and in actual practice has been found both durable and highly efficient for the purposes had in view.

What I claim is:

1. In an automatic belt guide, the combination with a pulley and an oscillatory support therefor, of a pair of levers fulcrumed at their lower ends, connected to the opposite sides of said oscillatory support at their intermediate portions, and having their upper ends projecting above said pulley in the vicinity of the ends thereof, whereby when either of said levers is engaged by the belt and moved in the direction of the travel of the engaging portion thereof the corresponding end of said pulley will be moved in the same direction, substantially as described.

2. In a belt guiding device, the combination with an oscillatory support, and a spindle carried thereby, of a pulley on said spindle, a pair of levers on said spindle having segmental gears at their lower ends and having upwardly projecting ends located at the opposite ends of the pulley, and fixed racks with which the said segmental gears engage, substantially as described.

3. In a belt guiding device, the combination with a supporting bracket having a vertical trunnion, of a yoke-like pulley support journaled on said trunnion, a spindle secured to the prongs of said pulley support, a pulley journaled on said spindle, a bar rigidly secured to said trunnion at its intermediate portion and provided with racks at its projecting ends, and a pair of levers pivoted on said spindle, said levers having at their lower ends segmental gears that mesh with the respective fixed racks and having upwardly projecting ends located at the opposite ends of said pulley, substantially as described.

In testimony whereof I affix my signature in presence of two witnesses.

ERASTUS H. GREGORY.

Witnesses:
H. D. KILGORE,
F. D. MERCHANT.